United States Patent [19]

Benhase et al.

[11] Patent Number: 4,464,713
[45] Date of Patent: Aug. 7, 1984

[54] METHOD AND APPARATUS FOR CONVERTING ADDRESSES OF A BACKING STORE HAVING ADDRESSABLE DATA STORAGE DEVICES FOR ACCESSING A CACHE ATTACHED TO THE BACKING STORE

[75] Inventors: Michael T. Benhase; Alan H. Duke, both of Tucson, Ariz.

[73] Assignee: International Business Machines Corporation, Armonk, N.Y.

[21] Appl. No.: 293,648

[22] Filed: Aug. 17, 1981

[51] Int. Cl.³ .......................... G06F 9/06; G06F 1/00
[52] U.S. Cl. .................................................. 364/200
[58] Field of Search ... 364/200 MS File, 900 MS File, 364/300

[56] References Cited

U.S. PATENT DOCUMENTS

| 4,068,304 | 1/1978 | Beausoleil et al. | 364/200 |
| 4,084,234 | 4/1978 | Calle et al. | 364/200 |
| 4,092,715 | 5/1978 | Scriver | 364/200 |
| 4,215,402 | 7/1980 | Mitchell et al. | 364/200 |
| 4,322,815 | 3/1982 | Broughton | 364/900 |
| 4,399,504 | 8/1983 | Obermarck et al. | 364/200 |
| 4,403,288 | 9/1983 | Christian et al. | 364/200 |
| 4,410,941 | 10/1983 | Barrow et al. | 364/200 |

OTHER PUBLICATIONS

Knuth, Donald E., *The Art of Computer Programming*, 8/6/73, vol. 3, Sorting and Searching, pp. 506-542.
Carter et al., "Class of Fast Hash Functions Using Exclusive Or", IBM Tech Disc. Bull., vol., pp. 4822-4823, May '77.
Brent, "Modified Linear Scatter Storage Technique", IBM Tech Disc. Bull, p. 3489, Apr. 72.
Waguespack, "Predistributed Logical Name Generation", IBM Tech Disc. Bull., pp. 38-39, Jun. 1975.
Arnold et al., "Uniform Hashing Algorithm", IBM Tech. Disc. Bull., pp. 2214-2216, Dec. 73.

Primary Examiner—Gareth D. Shaw
Assistant Examiner—Daniel K. Dorsey
Attorney, Agent, or Firm—H. F. Somermeyer

[57] ABSTRACT

A cache is accessed based upon addresses to a backing store having a larger address space than the cache. The backing store consists of plurality of devices exhibiting delay access boundaries. The cache accessing is based upon a hashing method and system derived from the arrangement of the backing store and in an ordered manner for accommodating the delay access boundaries and enable rapidly adjusting the hash parameters in accordance with changes and backing store capability in other hardware changes.

14 Claims, 11 Drawing Figures

HASH CLASSES

CYLINDERS-C-OFFSET
TRACKS-H-ADJACENT
DEVICES-BALANCED SPACES
DEVICES-D-OFFSET

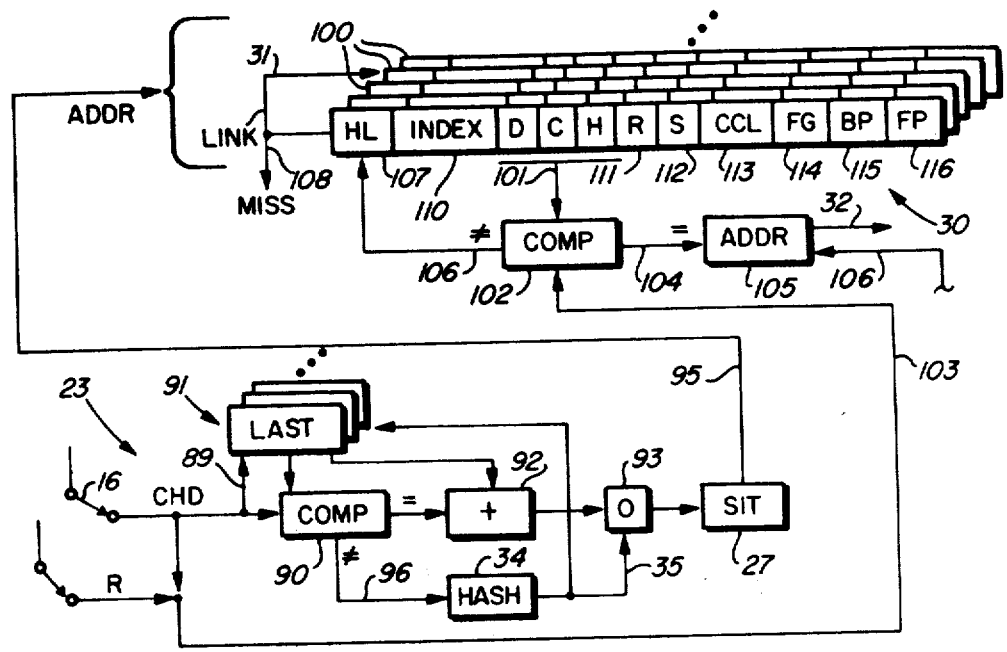
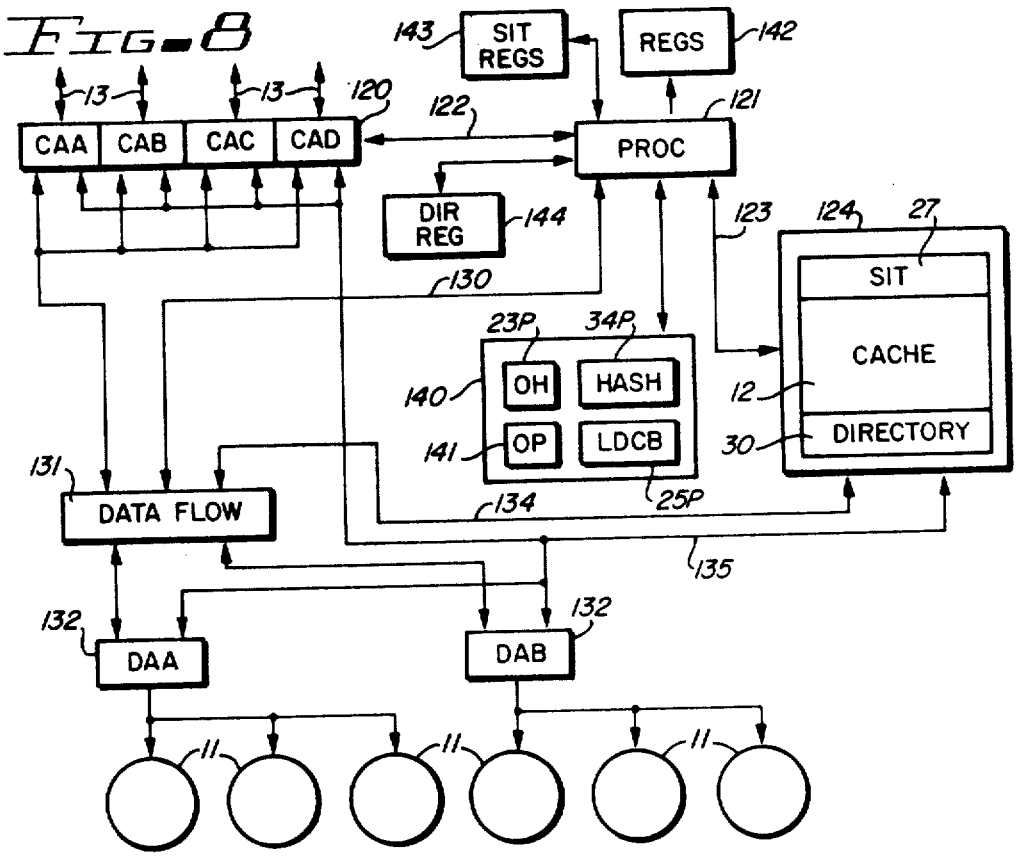
FIG-7
FIG-8

METHOD AND APPARATUS FOR CONVERTING ADDRESSES OF A BACKING STORE HAVING ADDRESSABLE DATA STORAGE DEVICES FOR ACCESSING A CACHE ATTACHED TO THE BACKING STORE

BACKGROUND OF THE INVENTION

1. Field of the Invention

Present invention relates to hierarchical storage systems, more particularly it relates to addressing techniques used within such systems.

2. Discussion of the Prior Art

Addressing large capacity memories have used so-called "hashing" techniques for years, particularly in the main memory area. Generally, a hashing operation includes generating an index indicator for a so-called hash class. The index indicator directs the addressing mechanism to a so-called scatter index table (SIT) which contains the address of a memory-address directory entry supposedly relating to the area of memory to be accessed. The directory entry is linked to other directory entries of the same hash class by a singly linked list. Accordingly, to access a given item within a memory, the index indicator is generated, the address to the directory entry is used to access a directory entry. If no match between the desired memory address and a memory address stored in the directory entry is found, then a succession of directory entries are examined within the hash class to see if the directory has an address indicating that the memory contains the data or has space allocated for receiving data. In the event such an area is identified in the directory, a so-called "hit" is made; access to the memory can proceed. If the area is not identified through the hashing technique, then a "miss" occurs. Following a miss in hierarchical systems, data is either transferred from a backing store to the memory or space is allocated within the memory to receive data for recording.

When the size of a hash class is large, many items are mapped into that class. This plural mapping is often referred to as "collisions" in that multiple data items collide into the same hash class. Searching hash classes due to a large number of collisions can greatly increase the access time to a memory, particularly when the directory is not content addressable. Accordingly, in many memory applications it is desired to keep the size of the hash class to a minimum for reducing the searching time of the directory. In contrast, when a content addressable memory is used for the directory, all searches are all conducted in one cycle. Unfortunately, content addressable memories are expensive, therefore in many applications such a content addressable memory is not feasible.

The problem becomes particularly acute in relatively large memories. For example, when a large cache is to act as a buffer for disk storage apparatus (DASD) and the cache has the capacity of 8 megabytes or greater, there is a conflict between reducing the number of collisions and controlling costs of the storage system. A further problem occurs in that disk storage apparatus exhibits several delay access boundaries. A first delay boundary called latency, is based upon the rotational characteristics of the disk storage apparatus. One or two transducers are positioned with respect to a rotating disk surface such that access to a given point on the surface depends upon the latency of rotation. Further, in most disk storage apparatus, a single transducer is provided for a single recording surface. This means the transducer is moved radially from track to track (in a multi-surface disk storage apparatus the move is from cylinder to cylinder—a cylinder being all tracks on the same radius) called a cylinder seek. Both of these delays in addressing and accessing are due to the mechanical characteristics of the disk storage apparatus. Accordingly, the number of misses in a cache that do not accommodate such mechanical delays can greatly increase access times to data areas. Accordingly, it is desired to provide access to a cache which minimizes the effect of such mechanical delays in the backing store on total system operation.

Many prior hashing techniques employ random distribution of the addresses such that the number of collisions tend to be reduced. A corollary is that the addresses should be evenly distributed across the address space of the memory being accessed. Such principles are set forth in several articles published in the IBM Technical Disclosure Bulletin. For example, in May, 1977, pages 4822–4823, J. L. Carter, et al in "Class of Fast Hash Functions Using Exclusive OR" and on page 4826 in the article "Method of Extending Hash Functions for Long Keys" teach that a pair-wise random hashing function produces an average running time which is linear to the number of transactions. While this is true for random access memories, such as employed for main memories, it is not necessarily true where access delay boundaries exist. Accordingly, the so-called "Constant of Proportionality" discussed in these articles does not validly apply to all situations particularly where access delay boundaries exist.

Prime numbers have also been used in hashing techniques. For example, see the article by R. P. Brent "Modified Linear Scatter Storage Technique" found on page 3489 of the April, 1972 edition of the IBM Technical Disclosure Bulletin. Again, this article relates to a hashing technique suitable for random access memories not having significant access delay boundaries.

Another aspect of hashing is to reduce the hash time, i.e. reduce the time it takes to generate an address. Such reduction has been achieved by judiciously selecting names for data which are convertible to an address. For example, in the IBM Technical Disclosure Bulletin, June, 1975 issue on pages 38–39, L. J. Waguespack in "Predistributed Logical Name Generation" shows a hashing technique wherein a single level Exclusive-OR hash is driven by predistributed logical names for accessing random access memories. A similar technique is shown in the article by D. C. Bossen, et al "Generating Unique Names for Virtual Segments" published in the IBM Technical Disclosure Bulletin August, 1975, pages 880–881. This article is similar to Waguespack's article in that address predistributions and Exclusive-OR functions result in a hash table addressing.

In an installed data processing system, memories can be changed in size. Accordingly, the hashing technique should be easily altered. This situation was addressed in one of the articles mentioned above, but also set forth in U.S. Pat. No. 4,215,402 where the SIT and hash size are matched to main memory size. Again, the hashing was for a pure random access memory not exhibiting significant access delay boundaries.

A summary of desirable hashing techniques is set forth in the IBM Technical Disclosure Bulletin article by R. F. Arnold, et al "Uniform Hashing Algorithm", pages 2214–2216 of the December, 1973 issue. This article relates to mapping virtual address space into a real address space. Desirable properties of the hashing algorithm used to map the address spaces is uniformity of distribution, random distribution of the sequential virtual addresses, and below the granularity of hashing provide sequential virtual addresses that map to real addresses. All addresses should match one for one from virtual to real, minimum remapping is to be required in the hash for memory changes, computation should be rapid (short delay) and repeatable. A portion of the hashing algorithm described in this article requires iterative processes where a hit does not occur immediately. It does employ arithmetic techniques including carries and borrows as opposed to modulo two addition (such as Exclusive-OR functions). While this article shows hashing procedures desirable for a random access memory not having significant access delay boundaries, it is not seen how the teaching can be applied to backing stores exhibiting various access delay boundaries.

In addition to all of the above, a hierarchical storage system can have a plurality of disk storage apparatus. A single cache should provide the caching function for all of the apparatus. Therefore, in addition to the internal access delay boundaries of such apparatus, hashing should accommodate unique characteristics of a plurality of such disk storage apparatus. For example, so-called cylinder "0" of each disk storage apparatus is usually used as an index to the contents of the data stored in the apparatus. Cylinder "0" is usually the radially outward-most cylinder of tracks. Accordingly, it is to be expected that cylinder "0" may be accessed more frequently than other cylinders of the disk storage apparatus; therefore there should be no collisions between cylinder "0" of one disk storage apparatus and cylinder "0" of another storage apparatus. Any random distribution, even though it be uniform, implies a possible collision of any relative address with another relative address. Accordingly, random distribution of hashing should be avoided when disk storage apparatus of usual design are employed.

SUMMARY OF THE INVENTION

It is an object of the present invention to provide hashing methods and systems which readily accommodate variations in size of address spaces and backing stores.

It is another object of the present invention to provide a hash-type access method and system that ensures a minimal number of hashing collisions for high use addresses.

It is another object of the invention to provide a method and system for hashing techniques which are readily expandable or contractable in size.

It is yet another object of the invention to provide a method and system for accessing which facilitates an accommodation of delay boundaries in a backing store when the hash access is for a cache or buffer related to a backing store.

In accordance with a first aspect of the present invention, a hashing method and system employs manipulation of address signals which are ordered in accordance with access delay boundaries of a backing store and with an expected frequency of access for certain addresses of the backing store.

An access method and system employing hashing in accordance with the invention, employs a predetermined SIT address space into which is mapped the number of delay units (for example, number of disk storage apparatus) in a given order and equally spaced distributions in the SIT address space such that all hashing space beginning with a lowest ordered address begins at a unique address within the SIT address space. The arrangement provides an ordered offsetting of all hashing for common relative addresses in each of the units constituting access delay boundaries.

A method and system employing hashing in accordance with another aspect of the invention includes altering the address being hashed by the size constant of the device addresses for addressing a smaller capacity cache memory in an ordered manner related to the constructional features of the device. For example, the number of devices in a backing store constitutes a first hashing factor for distributing the addresses in an ordered manner while the number of delay boundaries, i.e. cylinder in a disk storage apparatus, are a hashing factor for ordered cylinders hash addressing.

The foregoing and other objects, features, and advantages of the invention will be apparent from the following more particular description of preferred embodiment of the invention, as illustrated in the accompanying drawing.

DESCRIPTION OF DRAWINGS

FIG. 7 illustrates a directory construction and associated control circuits for implementing the invention shown in the FIG. 1 illustrated system.

FIG. 8 is a block diagram of a constructed version of the present invention as illustrated in FIG. 1.

DETAILED DESCRIPTION

Figure 1:
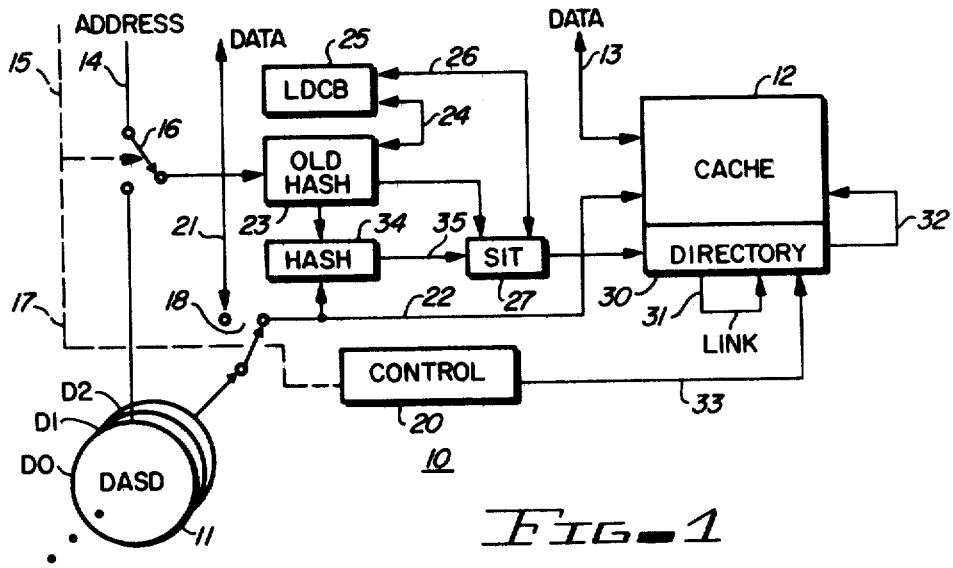
FIG. 1 is a block diagram of a hierarchical storage system employing the teachings of the present invention.

Referring now more particularly to the drawings, like numerals indicate like parts and structural features in the various diagrams. The present invention is preferably practiced in a hierarchical peripheral storage system 10, as shown in FIG. 1. A plurality of disk storage apparatus (direct access storage devices—DASD) 11 (separately enumerated as D0, D1, D2, . . . ) coupled to a shared cache 12 for transferring data to and from a host (not shown), such as a central processing unit or other computational facilities via input output connection 13. In a preferred mode, input output connection 13 is the input output connection used with the International Business Machines Corporation series 370 computers, no limitation thereto intended. Access to data or to data areas in either the cache 12 or DASDs 11 is through address bus 14 which can be a portion of the input output connection 13 in the 370 series. A portion of the DASD addresses can be supplied over a bus indicated by dotted line 15 to actuate a pair of electronic switches 16 and 18 which respectively direct address signals and data signals through different paths of the system 10. Numeral 15 in a second embodiment can designate a separate peripheral command which actuates the switches 16 and 18. For example, a command may indicate that all data references are to be through cache 12, then switch 16 is set to the illustrated position. On the other hand, a command may be received that all data references may be directed to DASDs 11 which causes the switch 16 to be switched to the alternate position, i.e. connect DASDs 11 to bus 14. Other means of controlling switch 16 may also be employed. The control indicated by numeral 15 also extends to switch 18 which either directs the DASD 11 connection to bus 21 for transferring data signals to a host. Bus 21 in turn can be connected to input output connection 13, such connection is not shown. Bus 22 extends from switch 18 to cache 12 such that data can be transferred between DASD 11 and cache 12. System 10 further includes a control 20 which further actuates electronic switch 18 such that the transfer of data signals between DASD 11 and cache 12 can be independent of and asynchronous to operation of the host. That is switch 18 position can be host directed or locally directed.

Assume that switch 16 is in the illustrated position. DASD address signals on bus 14 are directed to old hash circuits 23 to determine whether or not a previous reference to cache 12 will enable access to cache 12 without hashing the address received on bus 14. Since DASD 11 has a large capacity for storing data and cache 12 has a lower capacity, all-be-it a significant capacity, hashing address techniques using the addresses of DASD 11 are used to determine whether or not space has been allocated in cache 12 for a data access or whether given data is in fact stored in cache 12. In any event, old hash circuit 23 upon detecting the occurrence of a previously closely related address, as later described, directly accesses scatter index table (SIT) 27 which indexes the hash signal to directory 30 for accessing cache 12. LDCB 25, accessed via bus 24, contains the DASD address and the corresponding SIT 27 address.

Directory 30, as later described, contains one entry for each addressable segment of cache 12. Each entry will include an address indication for DASD 11 to indicate which data is replicated or cache space is allocated for cache 12. Since a hash class may consist of a plurality of directory 30 entries, a linking mechanism 31 links all of the entries in the same hash class together using a singly linked list. Once a directory entry is found that corresponds to the DASD 11 address, then cache 12 is accessed, via path 32, at the address indicated by directory 30. Then the data can be transferred directly between the host (not shown) and cache 12 via I10 connection 13. Of course, directory 30 may indicate a miss, i.e. no data space has been allocated in cache 12. In this instance, actions beyond the present description of this figure are required.

In the event old hash circuit 23 indicates that the previous reference to cache 12 was not immediate but remote from the presently received DASD address; then the presently received address is supplied to hash circuit 34 for the address hashing operation. As a result of the hashing operation, an address signal supplied over bus 35 identifies a given register in SIT 27. The contents of that register point to a directory 30 entry corresponding to a hash class. Then the directory 30 hash class is scanned as will be described.

In summary, access to cache 12 is via a set of DASD 11 address signals received on address bus 4 sent through old hash circuit 23 and then either through hash circuit 34 for a new hashing operation or directly to SIT 27 for generating an index or address signal for directory 30. Directory 30 is then accessed for scanning the entries in the hash class to look for a DASD 11 address corresponding to the received DASD address. On a hit or a favorable compare, cache 12 is accessed. Otherwise, a miss is indicated.

As mentioned, DASD 11 can be directly accessed. In this case, switch 16 is to the alternate (not shown) position, while switch 18 is also moved to its alternate position. In this mode, access to data and access to data storage areas for recording on DASD 11 is as in any disk storage apparatus system.

Upon a miss being indicated by directory 30, a control signal over bus 33 to control 20 for actuating switch 18 to illustrated position for transferring data signals from an addressed DASD 11 corresponding to the received DASD 11 address signals for transferring data signals from such DASD over bus 22 to cache 12. Of course before such transfer can occur, DASD 11 has to be available, i.e. not busy, and the directory 30 and hashing address must be setup such that access to cache 12 is enabled.

Figure 2:
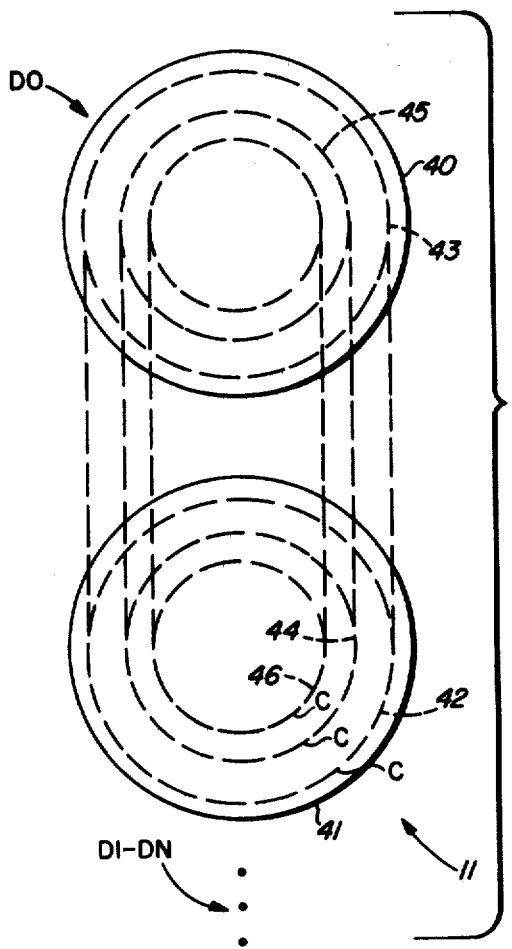
FIG. 2 is a diagramatic showing of a disk storage apparatus and its constructional relationship to hash addressing in accordance with the invention as shown in FIG. 1.

FIG. 2 illustrates a general arrangement of DASD 11. Generally each DAS device 11, such as D0, consists of a plurality of co-rotating disks 40, 41, each disk having a pair of surfaces for recording data signals. One of the surfaces of all of the surfaces in device D0 is reversed for positioning or servoing information. All of the tracks in a preferred form are concentric with all of the tracks being radially aligned with other tracks on other surfaces. For example, the two disks 40 and 41 each have a radially outermost track 42, 43 respectively. All of the tracks in the radially outermost position are termed cylinder O (C0). Since there is one head for each surface, when the servo position (not shown) aligns the head (not shown) with the C0 tracks, then any surface can be accessed through electronic switching to access any track in C0. To access another cylinder, all of the heads (not shown) must be moved radially to the addressed track, such as the next innermost tracks of cylinder C1 (not shown). This mechanical movement causes a substantial delay in accessing data areas and therefore is a significant delay access boundary. Other cylinders, of which there may be over 500 cylinders in a single disk apparatus, include cylinder X having tracks 44 and 45 respectively on disks 41 and 40. In a similar manner, cylinder Y will have track 46 on disk 41, while disk 40 has a similar track. In a similar manner, selecting DASD 11 devices requires substantial protocol and is also a delay access boundary.

All of the above characteristics are melded into the hashing method and system of the present invention in that a major factor in defining a hash class are the number of cylinders on each storge device. This results in a so-called cylinder offset in the hash addressing. All of the devices identified by device addresses have a balanced space assigned within the SIT 27 address space. Each hash class includes an address from each of the devices. In a small SIT 27, several cylinder address spaces from a given device may be within the same hash class, as will become more apparent. To further provide an ordered symmetry of hashing, the devices are offset as a function of the address size of SIT 27, i.e. the number of registers therein. Therefore the total number of devices is an offset so that all addresses for all C0s are never in the same hash class. Since C0 typically contains an index to data stored in the disk storage apparatus, it is a most commonly addressed cylinder. By keeping the most commonly addressed cylinder in different hash classes, the probability of a hash collision within the hashing operation is reduced. The adjacency of the tracks in the SIT 27 favors electronic switching between tracks by relating the addresses of the tracks to adjacent registers of SIT 27. The offsets of cylinders and devices provide for an easy adjustment of the hashing algorithm as the size of the cache 12 is varied or the size of SIT 27 is varied. It should be noted that when either cache 12 or SIT 27 is varied, all of the data in the cache 12 should be purged for data integrity purposes.

Figure 4:
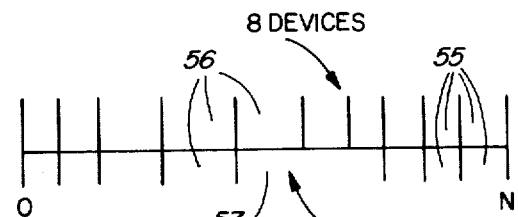
FIGS. 3 and 4 diagramatically illustrate disk apparatus addressee distributions within an address space for a scatter index table for use in connection with the FIG. 1 illustrated system.
Figure 3:
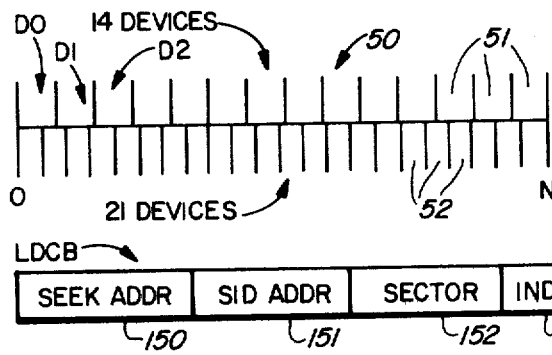

FIGS. 3 and 4 diagramatically show the SIT 27 address space as extending from "0" through "N" registers. The hashing algorithm enables all of the device addresses to be offset an identical amount from the base address "0" of SIT 27. For example, in the address space 50 of FIG. 3, fourteen devices (DASDs 11) are shown as having fourteen equally-spaced offsets 51. For example, device D0 has its cylinder "0" address at zero. Device D1 has its cylinder "0" address at N/14, device D2 has its cylinder "0" address at 2N/14. This means that each device DX will have a cylinder "0" indexed at SIT 27 address NX divided by the number of devices. Accordingly, when 21 devices are installed in the system 10, the smaller offsets 52 result. FIG. 3 shows all the devices 11 having an identical number of tracks. This restriction is not necessary for practicing the present invention, even though it does simplify implementation. In FIG. 4, the SIT 27 is divided into different offsets in accordance with the size or capacity in number of tracks of the various storage devices. For example, offsets 56 for larger devices are greater than offsets 55. In a similar manner, offset 57 is for a yet larger device.

Figure 5:
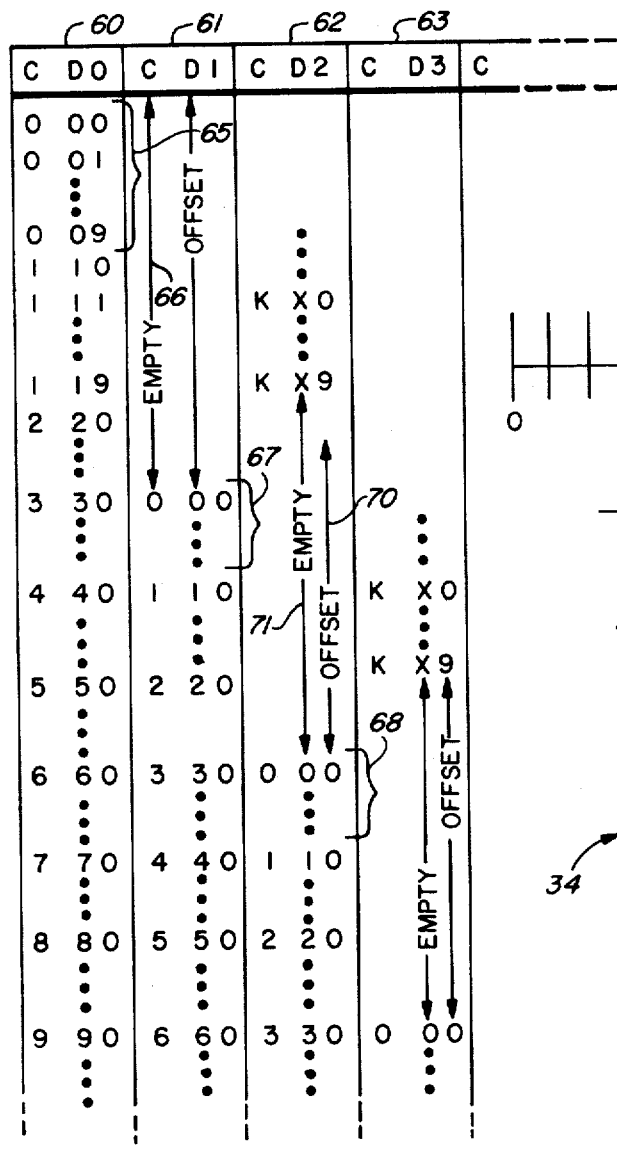
FIG. 5 is a map illustrating hash address distribution for a plural device embodiment of the FIG. 1 illustrated system.

FIG. 5 shows a map of how device addresses appear in SIT register addresses for accessing directory 30. The separate device addresses are respectively setforth in columns 60, 61, 62, 63 for devices D0–D3 respectively. The cylinder number C is indicated in the left hand column while the track number within the cylinder is indicated in the right-hand columns. As shown in FIG. 5, each cylinder has ten tracks, in a constructed embodiment each cylinder had fifteen tracks. The selection of ten is arbitrary and capricious and used for simplifying the illustration. The hash classes of the illustrated mapping of FIG. 5 correspond to the rows of cylinder and track identifications. For example, one hash class consists of address 660 of device D0, address 330 of device D1 and address 000 device D2 and no entry for device D3. For a small SIT 27, such a hash class could include one or more tracks from each of the devices. Cylinder C0 of device D0 is indicated by numeral 65 having tracks 00 through 09. Cylinder C1 of device D0 also has tracks 0 through 09 which in the illustrated embodiment are indicated by numbers 10 through 19. In a similar manner, all of the tracks within device D0 are identified with their respective cylinders. For purposes of illustration, it is assumed that SIT 27 is relatively large such that one hash class includes only one track from a given device. In this instance, device offset is three cylinders as indicated by a numeral 66; there is no overlap, i.e. there are relatively small devices with respect to the size of SIT 27. Cylinder C0 of device D1 appears at 67, while cylinder C0 of device D2 appears at 68. The arrangement is such following the device distribution of FIG. 3 and 4 that none of the cylinders C0 of any device will share a hash class with any other cylinder C0 of another device. In device D2, numeral 70 identifies the three cylinder device offset while numeral 71 indicates empty space, i.e. that space in SIT 27 which contains no track addresses for device D2. On the other hand, for a small SIT 27 with respect to the size of DASDs 11, each hash class could include two tracks from each device, three tracks from each device and so forth. Still cylinder C0 of any device will never share a hash class from a cylinder C0 of any other device. The principle is extended such that no like addressed cylinders are in the same hash class, i.e. cylinder X of D0 is always in a hash class different from cylinder X of any other device; X is an integer indicating a cylinder address.

Figure 6:
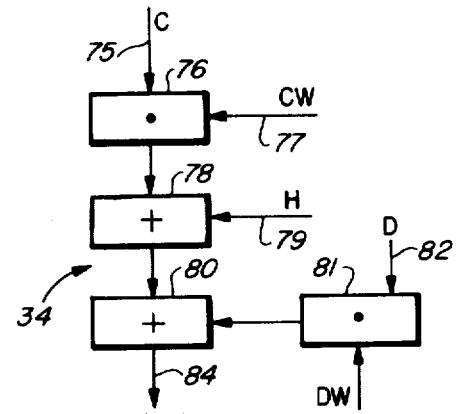
FIG. 6 is a logic diagram of a circuit for implementing the hash method and system in the FIG. 1 illustrated system.

FIG. 6 is a logic diagram illustrating hash circuit 34. Circuit 34 is an arithmetic circuit which results in an output at 84 with an SIT 27 register address which also identifies the hash class having a numerical value modulo the number of registers in SIT 27. Computation begins with the cylinder address C being supplied at 75 to binary multiplier 76, which multiplies it with the cylinder weight received at 77. Cylinder weight is the number of cylinders in the device. The resultant product is added in adder 78 to the track address H supplied over line 79. The product-sum is then supplied to modulo N adder 80 wherein the product-sum is added to the device offset product constituting the device number D and device weight DW respectively received at 82 and 83. Device weight is the number of SIT 27 registers divided by the number of devices 11. The SIT 27 address signals at 84 access SIT 27 for fetching the directory 30 index to the hash class.

FIG. 7 illustrates in more detail the hashing operation for system 10 shown in FIG. 1. The device address CHD (cylinder, head and device) are received via switch 16 into old hash circuit 23. In some addressing schemes a record R address can be also supplied which in the illustrated embodiment is not a part of the hashing process because the entire contents of a track of DASD 11 can be transferred to cache 12. In the event that a record is separately addressable in DASD 11 then the record number R could be introduced into the hashing algorithm using the inventive principles. In any event, the address CHD is supplied to comparator circuit 90 which compares the CH value of content of a register 91 selected by the D address signal supplied to registers 91 over bus 89. For a compare of C being equal, i.e. the track is in the same cylinder, compare circuit 90 supplies a difference signal to adder 92. The difference signal is the difference between the H value received from switch 16 and the H value stored in register 91. This difference value is added to the SIT address stored in the register 91 to generate a SIT address for CHD without hashing as described with respect to FIG. 6. This difference value plus the previous SIT address indicates the SIT 27 register containing the index to directory 30 for the track within the indicated cylinders. Accordingly, for all tracks within a cylinder, once a cylinder has been accessed, further hashing is not required whenever the hash result is temporarily saved. The sum of the old SIT address plus the difference is supplied through OR circuits 93 to address SIT 27. The contents of the addressed SIT 27 register are supplied over bus 95 to address directory 30. When the contents of the SIT 27 register are all zeroes, a cache miss is indicated.

In the event compare circuit 90 indicates that a different cylinder is being accessed, then a new hash occurs. The address CHD is supplied over bus 96 to hash circuit 34; bus 96 leads to line 75 of FIG. 6. Hash circuit 34 outputs a SIT 27 address over bus 35 through OR circuits 93 to address SIT 27. Also, the newly hashed SIT value is supplied to the last 91 register indicated by the D value supplied over bus 91 for addressing those registers.

The directory 30 address signals on bus 95 select one of the entry registers 100 as the first entry of the hash class in directory 30. The accessed register supplies the CHD values over bus 101 to compare circuit 102. In the event the record value is also supplied for comparison purposes, the record value in R section 111 of the directory 30 registers 100 is also supplied to compare circuit 102. The compare circuit 102 looks for equality between the DASD address stored in the directory 30 entry register 100 and the address received over bus 103. For a detected inequality, compare circuit 102 supplies an access signal over bus 106 to access HL section 107. HL section 107 is a portion of a singly-linked list for indicating the address of the next register 100 containing an entry in the same hash class. That next register 100 is accessed as indicated by line 31. In the event HL section 107 indicates EOC (end of the chain) a miss is indicated over line 108 which corresponds to line 33 of FIG. 1.

When compare circuit 102 indicates equality, a cache 12 hit is occuring. A signal supplied by compare circuit 102 over line 104 activates address generator 105 which takes the directory 30 address from bus 106 (access via bus 95 or through the HL section 107) and generates a cache 12 address based upon the directory 30 address. Cache address is supplied over bus 32 for accessing cache 12. Generator 105 multiplies the register 100 offset address by a constant to calculate a cache 12 offset address. The constant is the ratio of number of bytes in an addressible segment in cache 12 to the number of bytes in hash register 100. The cache 12 offset is then added to a cache 12 base address to obtain the cache 12 address. Instead of a calculation, the calculation result for each directory could be stored, either physically or logically with each directory entry.

Directory 30, in addition to containing the sections 101, 111 and 107, further includes an index 110 which is useful for identifying the directory entry. S section 112 contains the sector value of the record R, CCL contains the logical cylinder number (such as provided for virtual disk on real disk) and FG 114 contains miscellaneous control flags not pertinent to an understanding of the invention. BP 115 and FP 116 are respectively backward and forward pointers in an LRU (least recently used) list use in connection with space management of cache 12, as is well known in the buffer management art.

FIG. 8 illustrates a preferred implementation of the invention wherein two so called "strings" of DASDs 11 communicate with cache 12 and a host (not shown) via input-output connections 13. The input-output connections are controlled through channel adaptors 120 separately denominated as CAA, CAB, CAC and CAD. These channel adaptors employ the input-output connection logic of design used with the aforementioned IBM 370 series computer. A computer or processor PROC 121 communicates with the host via channel adaptors 120 through bus 122. For example, peripheral commands supplied by the host are transferred to PROC 121 via bus 122. PROC 121 in turn communicates over bus 123 with a so-called system storage 124. System storage 124 contains cache 12, the registers of directory 30 and the registers of SIT 27. System storage 124 is preferably a high speed random access memory of a semiconductor type. All addressing is by base addresses plus offset for cache 12, SIT 27 and directory 30.

PROC 121 communicates with DASD 11 over bus 130 which extends to device adaptors 132, separately denominated as DAA and DAB as well as to data flow circuits 131. Device adaptors DAA and DAB each respectively control and access one string of DASDs 11 and are constructed using known techniques. Data flow circuits 131 can include serializers; other circuits that are usually found in connection with such circuits used with disk storage apparatus. Bus 133 extends from data flow circuits 131 to channel adaptors 120 for providing direct access to DASDs 11. Bus 134 connects data flow circuits 131 to system storage 124, hence cache 12. Bus 135 connects system storage 124 to channel adaptors 120. The functions of switch 16 of FIG. 1 are performed in channel adaptors 120 using known electronic design techniques, while the functions of switch 18 are performed in data flow circuits 131.

PROC 121 has control storage 140, a high speed random access memory, which includes microcode type of computer programs for performing the hash circuit 34 functions as represented by program 34P. LDCB 25 registers are contained in control storage 140 at 25P. Other programs OP 141 provide for control of storage system 10 in the usual manner. Additionally, PROC 121 includes a plurality of high speed registers 142 for enhancing speed of microcode execution. Registers 142 constitute a scratch pad or work space for the processor. SIT registers 143 contain one "page" of SIT 27 for processing by PROC 121, that is once the hash program 34P has been executed by PROC 121, a page of SIT 27 corresponding to one or more cylinders of hash are transferred to SIT registers 143 such that the old hash 23 technique is expedited. Also, searching directory 30 results in a transfer of a page of directory entries to DIR REG 144 for similar rapid processing. In this manner, access to system storage 124 for control purposes is minimized to allow overlapping data processing signal transfers with control processing by PROC 121. Since there are four channel adaptors, four different operations can occur simultaneously. Further independent free standing operations by DASD 11 can be occurring, therefore PROC 121 should be able to do processing independent of system storage 124 as much as possible. Operation of the invention in the FIG. 8 environment is better understood by referring to FIGS. 9, 10 and 11. It is understood with respect to those figures that PROC 121 programs OP 141 including the usual idle scan or dispatching functions well known in the programming and data processing arts.

Figure 9:
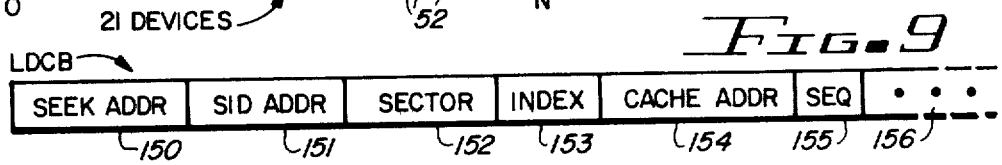
FIG. 9 shows a data structure of a logical device control block used in connection with FIG. 8.

LDCB registers 25P shown in FIG. 9 contain the DASD 11 addresses associated with a particular cache 12 access. For example, seek address 150 defines the cylinder while SID address and sector sections 151 and 152 identify which track and the portion of the track to be accessed in DASD 11. Index 153 corresponds to index 110 of FIG. 7. Cache address 154 is the cache address generated by address circuits 105 as well as OP 141. SEQ bit 155 signals that a succession of consecutively addressed blocks will be transferred in a so-called "sequential mode". SEQ 155 is set via a mode set command received from a host (not shown) signifying type of operations to be performed by system 10. Numeral 156 denotes that LDCB 25 may contain additional entries not pertinent to an understanding of the present invention.

Figure 10:
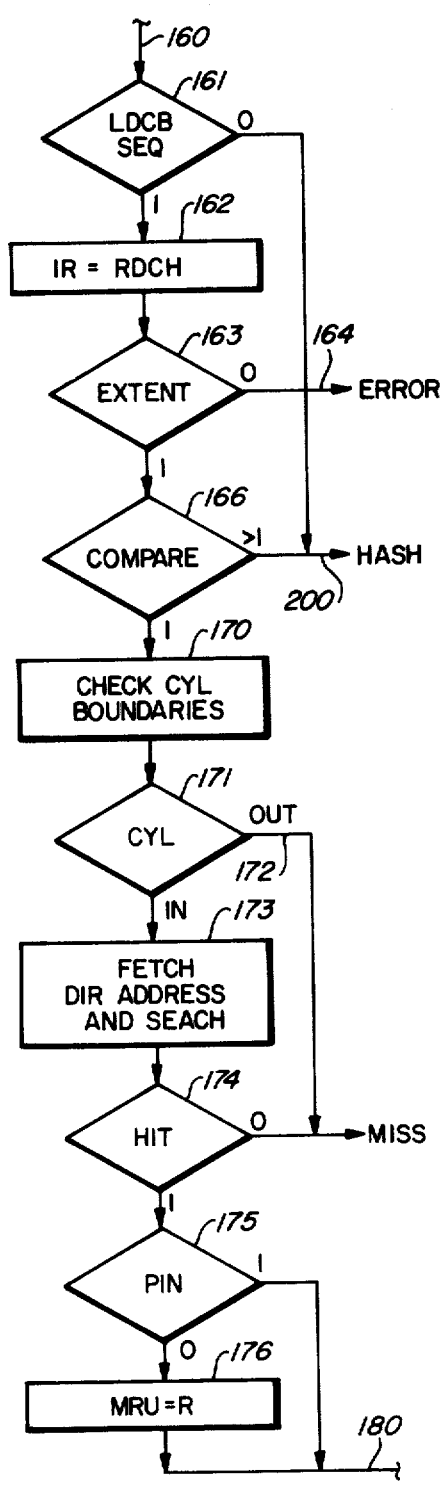
FIG. 10 is a logic flow diagram showing machine operations for avoiding hashing of sequential tracks within delay access boundaries in connection with the FIG. 8 illustrated system.

Referring next to FIG. 10, the old hash function as performed by hash circuit 23 or by program OH 23P of FIG. 8 are detailed in this machine operation flow chart. Initiation of the machine operations occurs at 160 which corresponds in FIG. 1 to the output of switch 16 and to the activation of OH 23P of FIG. 8. The first step is to access LDCB 25 to determine if SEQ 155 is set for indicating a sequential mode. That is, there is a high probability that a block of data residing in the same cylinder or in an immediately adjacent track as the immediately preceding block will be accessed. In the present implementation, only those addresses used during the sequential mode use the old hash principle. For a non-sequential mode, the hash operation performed by circuit 34 or program 34P is activated via logic path 200 and as detailed at the machine operation level in FIG. 11. For the sequential mode at step 161, processor 121 transfers the received address RDCH for the record R into an internal register IR (not shown). At 163 processor 121 compares the received address RDCH to the permitted extent of addressing for the address via channel adaptor 120, that is, a host (not shown) can send a so-called "define extent" command which sets the limits of access for a given channel path including a given channel adaptor 120. If the address RDCH is outside of the defined address space or extent, processor 121 follows logic path 164 to report an error condition to the host (not shown). Otherwise, at 166, processor 121 compares the received RDCH with the contents of the last registers 91, which in FIG. 8 are some of the registers 142. In the illustrated embodiment, if the difference between the received address RDCH and the last address in register 91 is greater than unity, then hash function is activated via logic path 200. When the track addresses H differ by one, one is added to the last register 91 contents, independent of cylinder boundaries, to increment or decrement the SIT 27 address by unity. The adjacent SIT 27 register is read out to access directory 30 without hashing. In the sequential mode only one hash operation may be necessary to access a plurality of data blocks from cache 12.

In an alternative embodiment, compare step 166 makes a compare to determine whether or not the received address RDCH is within the same cylinder as the address stored in last register 91. If so, the difference between the received address and the stored address will indicate the offset address of the SIT 27 registers containing the pointer corresponding to the received RDCH and the address stored in last register 91. This difference then can be added/subtracted from the value in the last register to obtain the SIT 27 register for indexing into directory 30.

In the present embodiment, promotion of data to cache before it is needed was limited to that data residing in a given cylinder, i.e. residing within a given set of delay boundaries. No limitation to this implementation is intended in the practice of the present invention. At 170 the cylinder boundaries are checked to see if the received address RDCH is in the same cylinder as the last address in register 91. If it is outside of the cylinder, processor 121 at 171 follows logic path 172 to report a miss, i.e. it knows the data has not been promoted into cache 12. On the other hand, when the received address RDCH is in the same cylinder as the address stored in last register 91, at 173 the directory 30 address is fetched from SIT 27 and a search for the hash class as described is conducted. Upon completion of the search, processor 121 at 174 determines whether the data has been identified as residing in cache 30. For example, if the SIT 27 entry is all zeros, then a miss is indicated immediately. Otherwise, the hash class of directory 30 is searched in a sequential manner. For a miss, normal allocation and data promotion procedures are followed. For a hit, processor 121 at 175 determines whether or not the data is pinned or bound to cache 30. Pinning or binding indicates that the data must remain in cache 30 until unpinned or unbound, i.e. it is not subject to a replacement algorithm. For pinned data, logic step 180 is followed to access the data from cache 12 or to prepare for storing data in cache 12. Otherwise, at 176 the record is made most recently used in the replacement algorithm LRU (least recently used); then logic path 180 is followed.

Figure 11:
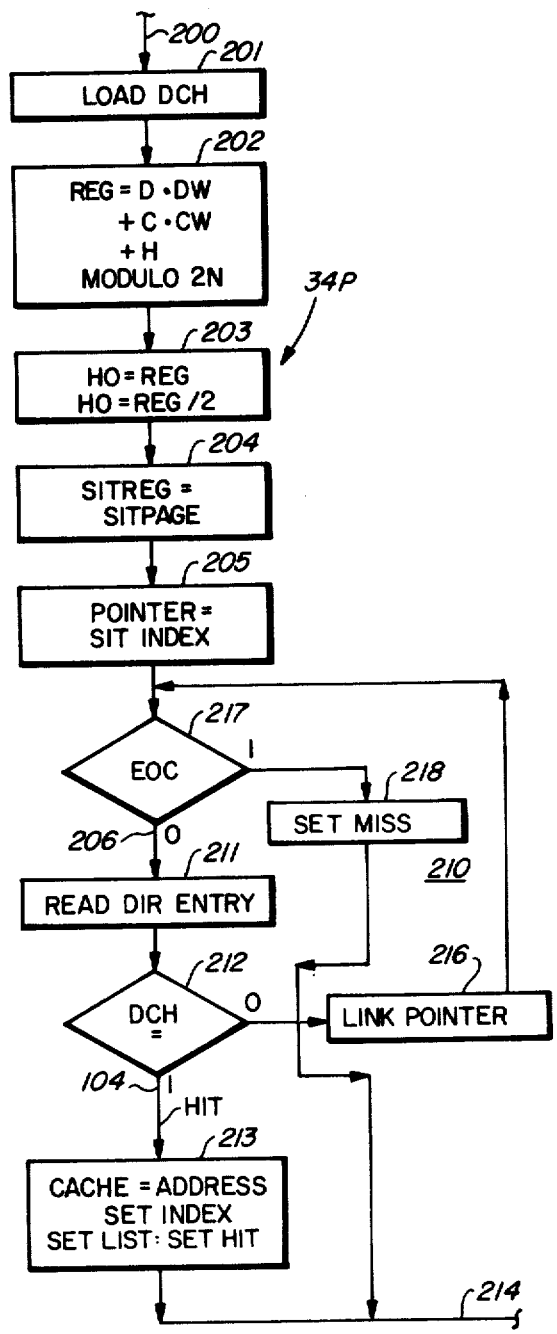
FIG. 11 is a logic flow diagram showing an implementation of the inventive hashing method in a machine operation sequence and system in the FIG. 8 illustrated embodiment.

FIG. 11 illustrates operation of hash microcode 34P. After the old hash operation 23 indicating an out of cylinder access, PROC 121 follows logic path 200 to box 201 to take the address DCH from LDCB 25P and place the address into registers 142. Steps 202 and 203 constitute the functions corresponding to hash circuit 34. Step 202 generates the address of SIT 27 and stores it into one of the registers 142 using the equation setforth in the box 202. Note that the value is twice the modulus of SIT 27, i.e. 2N rather than N. AT 203 the hash offset (HO) is made equal to contents of the one register 142 while the hash cylinder is the value of the contents of the one register 142 divided by two. Then at 204, the contents of SIT 27 contain in system storage 124 which contains the registers identified by HO and HC are transferred to SIT register 143. At 205, the SIT register 143 corresponding to HC is read out for obtaining the pointer to the entry in directory 30 which contains the entry corresponding to the hash value. Then beginning at 217, directory 30 is searched within a search loop 210. End of chain (end of hash class) is always checked at 217; if SIT has a zero entry, EOC is also indicated at 217.

Searching directory 30 within a given hash class requires a transfer of directory 30 portion to directory register 144. This transfer is implied in directory 30 search loop 210. This loop corresponds to the FIG. 7 illustration including compare circuit 102. At 211 the directory 30 entry is read and transferred to register 144. At 212, the value of the DASD address, DCH, contained in the directory entry, is compared with the DCH value received from the host and stored in register 142 at step 201. When there is a non-compare, the scan must continue; PROC 121 follows logic path 215 to read the link pointer, HL 107, for identifying the next directory 30 entry to be examined. At 217, the contents of the link pointer are examined to determine whether or not it is the end of the chain (EOC). If it is the end of the chain, a cache miss has occurred and a miss flag in registers 142 is set at 218 for later use by PROC 121. The program is exited at 214 for further processing of command execution as is known in the data processing art. In the event that the hash class does not finish at 217, steps 211 and 212 are repeated. The loop continues until either a miss occurs or a hit is indicated at 212.

For a cache hit, PROC 121 follows logic path 104 (also Fig. to 7) step 213 for generating the cache address. Step 213 corresponds to address generator 105. The cache address is generated based upon the address of the directory 30 register entry in register 144 as modified in a predetermined manner for generating the cache address or fetching the cache address from the directory 43 entry. That is, there is one directory 30 entry for each addressable segment of cache 12. Accordingly, the spatial relationship can be established. The index 110 is then set into index 153 of LDCB 25P. A flag (not shown) called hit in register 142 is also set and the LRU list is updated by adjusting the backward and forward pointers 115 and 116 to make the just-identified segment of cache 12 the most-recently used. Updating LRU lists are well known and not described for that reason. The received address RDCH and the SIT 27 address are stored in last registers 91.

While the invention has been particularly shown and described with reference to the preferred embodiments thereof, it will be understood by those skilled in the art that various parting from the spirit and scope of the invention.

What is claimed is:

1. The method of indirectly addressing a buffer memory having a first plurality of addressable buffer segments and being coupled to a backing memory having a second plurality of addressable memory segments distributed among a given plurality of addressable data storage devices, said second plurality of addressable memory segments being more than either said first plurality of buffer segments or said given plurality of data storage devices;

the method employing the numerical relationships of the second plurality of memory segments to the given plurality of data storage devices, comprising the machine-implemented steps of:

establishing a directory with entries for respectively identifying said buffer segments for individually addressing same, and each entry having link elements for linking entries into address classes to form a linked list in each of said address classes;

establishing and maintaining a scatter index table (SIT) for containing signals stored in a given number of addressable fields for pointing to said linked entries of one of said address classes, one signal pointer for each of said address classes in each of said addressable fields;

sequentially addressing said SIT addressable fields for accessing said signal pointers to address said linked entries of said address classes in said directory;

after accessing each of said signal pointers, addressing said linked entries in said directory using said accessed signal pointers, respectively, for accessing said buffer segments which are to store data corresponding to data stored in respective ones of said memory segments in respective ones of said addressable data storage devices identified in said SIT fields; and each of said linked entries having addresses of said addressable memory segments separated by a number of addresses equal to the quotient of said second plurality divided by said given plurality such that said memory segments of said respective data storage devices bearing the same address within the respective data storage devices are assigned to different ones of said address classes.

2. The method set forth in claim 1 and practiced in apparatus having said memory segments grouped into cylinders, each cylinder having a given plurality of said memory segments and any change in memory segment accessing from one cylinder to another cylinder being an access delay boundary which requires a predetermined delay time substantially greater than any access delay between segments grouped within a one of said cylinders;

the method further including the step of:

maintaining all of the addresses of said memory segments within a given cylinder to be in sequential ones of said address classes such that given memory segments accessible after accessing a certain memory segment within a cylinder, and hence in a relatively short time, are all assigned to different ones of said address classes.

3. The method set forth in claims 1 or 2 for practice in apparatus having said memory segments grouped into cylinders of such segments with an access delay occurring in accessing the memory segment in one cylinder, then accessing a second memory segment in another cylinder;

the method further including the steps of:

addressing cylinders within any one of said addressable data storage devices by the same respective addresses; and identifying all cylinders having the same respective addresses in different ones of said address classes, respectively.

4. The method set forth in claim 3, further including the steps of:

saving the address class and the address of a last-accessed buffer segment;

receiving a new address for accessing a memory segment;

comparing said received address with the address of the last-accessed segment for determining the address increment therebetween and whether both said last-accessed and new addressed memory segment are in the same cylinder;

if said received memory segment new address is within a same cylinder as said last-accessed segment address, modifying said address class by the increment between the previous and newly received addresses, then accessing said SIT in accordance with said modified address class;

otherwise addressing said SIT as set forth in claim 1.

5. The method set forth in claim 1, further including the steps of:

in said SIT addressing including multiplying a said cylinder address by the number of cylinders in a one of said data storage devices to yield a cylinder product;

summing the cylinder address products with a memory segment address; and summing said cylinder address sum with the product of an addressable data storage device address as modified in a predetermined manner by the number of said addressable data storage devices.

6. The method of evenly distributing a number of first addresses for storage elements in a buffer store in accordance with a backing store hardware structure and having a hierarchy of addressing levels; a first one of said addressing levels including a plurality of device addresses and each of the first-level addresses enabling access to a corresponding plurality of sequential addresses in a second level of addressing for a plurality of addressable backing store storage elements the number of said first addresses being fewer than the plurality of said hierarchical second-level addresses; a directory containing said first and corresponding hierarchical first- and second-level addresses of data stored in said buffer store in pairs for enabling accessing said storage elements in the buffer store by using the first- and second-level addresses contained in said directory;

including the automatic steps of:

arranging said hierarchical addresses into a given number of address classes wherein each class includes a given predetermined number of ones of said sequential addresses in said first addressing level such that each said predetermined one sequential address belongs to but one of said address classes;

generating an index to said directory for buffer addresses from said hierarchical addresses wherein each index corresponds to a one of said address classes such that each index identifies an address in said second-level of addresses for each and every one of said first-level addresses in accordance with a predetermined arithmetical relationship between said first and second first-level addresses, modulo said given number; and accessing said directory using a one of said hierarchical addresses in accordance with said index to fetch an address of said buffer store identified by said one of said hierarchical addresses.

7. The method set forth in claim 6 for apparatus wherein each second-level address further relates to a plurality of third-level addresses;

further including the steps of:

multiplying the first-level address by a number representing the number of addresses within the first level to form an offset product;

multiplying the second-level address by the total number of second-level addresses to provide a cylinder product;

summing the third-level address with the cylinder product and the offset product to provide a hash class indication; and limiting said hash class indication to modulo said given number.

8. In an addressing apparatus for a buffer memory having addressable buffer segments coupled to a backing store having a first number of addressable units, each unit having a second number of addressable memory segments in a third number of cylinder sets, said second number being larger than said third number, said addressing apparatus being responsive to a backing store address having unit and segment addresses for addressing said units and segments within an addressed unit, respectively, for addressing buffer segments;

the improvement in said addressing apparatus comprising:

a directory unit means coupled to said buffer memory for containing addresses of said buffer segments that are storing signals relating to said memory segments and containing the unit and memory segment addresses for the buffer memory stored signals, respectively, and having a plurality of addressable entry means, respectively, and a given number of link means in said plurality of addressable entry means, respectively, for indicating said given number of address classes for said memory segments;

an index table means coupled to said directory unit having means and said given plurality of addressable registers each for containing an address of respective ones of said link means such that a one of said entry means having a one of said link means can be addressed via said index table means within an address space having sequential addresses from a base address through a limit address for a given number of said addresses;

index table address generating means coupled to said index table means for receiving said backing store addresses, said backing store addresses each including unit and segment addresses, and having first means for arithmetically modifying said received unit address, modulo said given number, by said first number, second means for multiplicatively modifying said received segment address gy said third number to produce a cylinder product, third means coupled to said second means for receiving said cylinder product for arithmetically modifying said cylinder product by said second number and fourth means coupled to said first and third means for summing, modulo said given number, said modified unit address and said summed product and second number to produce an index address;

means coupled to said fourth means of said generating means for being responsive to said index address to address said directory unit means at an entry address indicated by the contents of said index table means register indicated by said generated address; and compare means coupled to said responsive means for receiving said received backing store address and said stored signals in said directory unit means addressed entry to determine the address of said buffer segment, if any, that relates to the addressed memory segment.

9. In a peripheral storage system having a plurality of direct access storage devices (DASD), each DASD having a plurality of cylinders with access between diverse cylinders crossing an access delay boundary, each cylinder having a plurality of addressable DASD segments;

a high-speed, random-access buffer having a plurality of addressable buffer segments having the same size as said DASD segments and means for transferring signals between said DASDs and said buffer;

the improvement including, in combination:

a programmed digital processor having a control store and being connected to said high-speed, random-access buffer to said means for transferring, and to said DASDs for operating such connected said high-speed, random-access buffer, said means for transferring, and said DASDs in accordance with a program of instructions stored in said control store;

directory means operatively associated with said processor and said buffer for storing electrical indications of data stored in said high-speed, random-access buffer by storing in separate respective entries the buffer-segment addresses having data stored therein associated with a respective DASD address together with a link indicator for linking entries within the directory means corresponding to a given class of DASD addresses, respectively;

SIT means having an address space modulo a given number and having said given number of addressable registers, each register for storing electrical indications of a respective one of said address classes such that the directory means entry storing a DASD address in the address class is identified by the stored electrical indications in said SIT means, said SIT means being operatively associated with said directory means and said digital processor;

said control memory including a buffer-address-generating control program for enabling the processor to access said SIT means for indirectly accessing the directory means to address said buffer; and said control program including control program portions for respectively enabling said processor to generate an address class indication modulo the given number including the steps of taking the DASD address and multiplying same by the number of devices to generate an offset product, taking the number of cylinders and multiplying it by the cylinder address to generate a cylinder product; then summing the cylinder product, the offset product and the memory segment address, modulo said given number to generate the address class for accessing said SIT means and said directory means and said buffer using said address class.

10. The machine-implemented method of accessing a buffer memory having a given plurality of addressable buffer segments and operatively coupled to a backing memory having a first plurality of addressable data storage devices, each of said addressable data storage devices having a second plurality of addressable memory segments, each of said buffer segments having the same signal-storage capability as each of said memory segments, said memory segments being addressable by a same respective memory address; said memory segments being grouped into addressable cylinders of said memory segments, each of said addressable data storage devices having a certain number of said addressable cylinders;

including the automatic steps of:
 arranging the addresses of said memory segments into staggered arrays of addresses by unit and within a limited address space extending from a base address through a limit address such that said memory segment addresses of each unit begin at identical respective address displacements from said base address and continue sequentially within said limited address space in a wrap-around fashion such that predetermined ones of said memory segment address for each of said addressable units never have the same address in said limited address space;
 receiving an access address having an address of an addressed one of said memory segments, including the device address, cylinder address, head address, and rotational address, for a given memory segment of a given addressable unit; and
 generating an address within said limited address space from said received access address by summing modulo said limited address space, the address of the memory segment in said received access address and the product of the device address in said received access request multiplied by the number of said data storage devices and the product of the cylinder address in said received access request multiplied by said certain number.

11. A method for operating a storage subsystem including a cache, a backing storage, and a controller, the controller maintaining in the cache copies of a variable subset of the records of the backing storage together with a directory for locating the same, employing a hashing protocol via a hash mechanism for accessing the cache and which has address classes for the backing storage address to facilitate accessing the cache, the backing storage being inherently modular and having functional discontinuities between modules, each module having a plural record storage capacity with the expectancy of certain known preferred modules, because of their actual or intended record content, being more frequently accessed than other modules;
 the improvement, including the machine-implemented steps of:
 maintaining the directory in the form of independent strings of entries incorporating link elements defining each string and a sequential order therein;
 maintaining a scatter index table for the classes defined under the hashing protocol for pointing the classes onto the directory strings;
 activating the hashing mechanism to access the scatter index table to access a directory string to access the entries of that string sequentially in link order to a match, giving a "HIT", or to end of the string, giving a "MISS";
 activating the hashing mechanism to map records onto scatter index table entries such that, given a table entry order, sequential records within a module map onto sequential table entries, and no record in a preferred module maps onto the same table entry as does any record in any other preferred module.

12. A method including the method of claim 11 for practice in apparatus having a backing storage comprising plural data storage devices, each of the plural data storage devices incorporating plural modules, the hash mechanism including a partial bypass storing the last executed hash transform for each of said units;
 further including the steps of:
 comparing the module identity of a presented address with the module identity stored for the addressed data storage device to permit use of the bypass if found equal and modifying the stored table entry point by an amount corresponding to the difference between the stored and presented record identities, then subsequently rewriting the bypass stored transform when the bypass cannot be used and the full hash mechanism was invoked.

13. In an address-conversion circuit for generating an index to an address of a buffer data store using an address of a backing data store wherein the backing data store has a first number of individually addressable data storage devices, each of said individually addressable data storage devices having a second number of individually addressable data storage segments with each of said segments being capable of addressably storing a predetermined number of data bytes, each of said individually addressable data storage devices further being constructed to arrange said second number of individually addressable data storage segments into a third number of individually addressable cylinder sets of said individually addressable data storage segments;

the improvement, including in combination:

input means for receiving a backing store address having a first device-address portion for addressably indicating a one of said first number of individually addressable data storage devices, a second cylinder-address portion for addressably indicating a one of said third number of individually addressable cylinder sets of said addressably-indicated one of said individually addressable data storage units and third segment-address portion for addressably indicating a one of said second number of individually addressable data storage segments in the addressably-indicated one of said individually addressable cylinder sets;

first circuit means of said address-conversion circuit coupled to said input means, a cylinder set weight means for storing said third number and coupled to said first circuit means for supplying said third number to said first circuit means, said first circuit means combining said third number with said received second portion of said received backing store address to generate a cylinder set output number;

second circuit means of said address-conversion circuit coupled to said input means for receiving said third portion of said received backing store address and coupled to said first circuit means for receiving said cylinder set output number for additively combining said received third portion with said cylinder set output number to generate a fourth number;

third circuit means of said address-conversion circuit coupled to said input means for receiving said first portion of said received backing store address, a device weight means storing said first number and being coupled to said third circuit means for supplying said first number thereto, said third circuit means for combining said first number with said received first portion of said received backing store address to generate a fifth number;

fourth circuit means of said address-conversion circuit coupled to said third circuit means for receiving said fifth number and coupled to said second circuit means for receiving said fourth number for additively combining said fourth and fifth numbers to generate an index to the buffer address;

output means of said address-conversion circuit coupled to said fourth circuit means of said address-conversion circuit means for receiving said index for supplying an output signal indicative of said index; and modulo means in said address-conversion circuit coupled to said first, second, third, fourth and output means for limiting the output signal indicated index to a predetermined modulus such that the output signal represents a number smaller than said fourth number.

14. In a data storage hierarchical system having a cache coupled to a backing store with a plurality of addressable data storage devices, each said data storage device having addressable cylinders, each cylinder having addressable data storage segments means for transferring data therebetween, attachment means for connecting the system to a host processor and being coupled to said cache and said backing store for enabling transfer of data between a connected host processor and the system including receiving addresses from such connected host processor for the backing store having a first address field for indicating an address of a one of said data storage devices, a second address field for indicating cylinder address of a data storage device being addressed and a third address field for indicating a storage segment within the cylinder being addressed, a digital processor having program storage means for storing programs of instructions for enabling said processor to operate the system and being coupled to said attachment means, said cache, and to said backing store;

the improvement, including in combination:

first program means in said program storage means for enabling said digital processor to convert an address received from said attachment means into an index value usable for accessing the cache while using the backing store address;

second program means in said program storage means for storing a first number indicating the number of said data storage devices, a second number indicating the number of said cylinders in a one of said data storage devices and a third number indicating the number of said storage segments in a one of said cylinders;

third program means in said program storage means for enabling said digital processor to execute said first program means while using the number stored in said second program means such that the backing store physical configuration determines the conversion of said received address into said index value; and fourth program means in said program storage means for enabling said digital processor to use said index value to generate a cache address for accessing said cache.

* * * * *

UNITED STATES PATENT AND TRADEMARK OFFICE
CERTIFICATE OF CORRECTION

PATENT NO. : 4,464,713

DATED : August 7, 1984

INVENTOR(S) : Michael T. Benhase and Alan H. Duke

It is certified that error appears in the above—identified patent and that said Letters Patent is hereby corrected as shown below:

Abstract, line 9    Change "and" to --in--

Abstract, line 10    Change "in" to --and--

Col. 6, line 41    Change "reversed" to --reserved--

Col. 16, line 26    Change "gy" to --by--

Signed and Sealed this

Twenty-fifth Day of December 1984

[SEAL]

Attest:

*Attesting Officer*

GERALD J. MOSSINGHOFF

*Commissioner of Patents and Trademarks*